United States Patent
Kohsaka et al.

(10) Patent No.: US 11,254,995 B2
(45) Date of Patent: Feb. 22, 2022

(54) STEEL SHEET, COATED STEEL SHEET, METHOD FOR PRODUCING HOT-ROLLED STEEL SHEET, METHOD FOR PRODUCING FULL HARD COLD-ROLLED STEEL SHEET, METHOD FOR PRODUCING STEEL SHEET, AND METHOD FOR PRODUCING COATED STEEL SHEET

(71) Applicant: JFE Steel Corporation, Tokyo (JP)

(72) Inventors: Noriaki Kohsaka, Tokyo (JP);
Yoshimasa Funakawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 815 days.

(21) Appl. No.: 16/089,138

(22) PCT Filed: Mar. 17, 2017

(86) PCT No.: PCT/JP2017/010819
§ 371 (c)(1),
(2) Date: Sep. 27, 2018

(87) PCT Pub. No.: WO2017/169869
PCT Pub. Date: Oct. 5, 2017

(65) Prior Publication Data
US 2020/0299797 A1    Sep. 24, 2020

(30) Foreign Application Priority Data
Mar. 31, 2016 (JP) .............................. JP2016-070736

(51) Int. Cl.
*C21D 9/46* (2006.01)
*B32B 15/01* (2006.01)
*C21D 6/00* (2006.01)
*C21D 8/02* (2006.01)
*C22C 18/00* (2006.01)
*C22C 38/00* (2006.01)
*C22C 38/02* (2006.01)
*C22C 38/04* (2006.01)
*C22C 38/06* (2006.01)
*C22C 38/10* (2006.01)
*C22C 38/12* (2006.01)
*C22C 38/14* (2006.01)
*C22C 38/42* (2006.01)
*C22C 38/48* (2006.01)
*C22C 38/50* (2006.01)
*C22C 38/58* (2006.01)
*C22C 38/60* (2006.01)
*C23C 2/02* (2006.01)
*C23C 2/06* (2006.01)
*C23C 2/40* (2006.01)

(52) U.S. Cl.
CPC .............. *C21D 9/46* (2013.01); *B32B 15/013* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C22C 18/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/42* (2013.01); *C22C 38/48* (2013.01); *C22C 38/50* (2013.01); *C22C 38/58* (2013.01); *C22C 38/60* (2013.01); *C23C 2/02* (2013.01); *C23C 2/06* (2013.01); *C23C 2/40* (2013.01); *C21D 2211/004* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 10,724,114 B2* | 7/2020 | Yokoyama | ............... C23C 2/06 |
| 10,961,600 B2* | 3/2021 | Takashima | ........... C21D 8/0263 |
| 2003/0047256 A1 | 3/2003 | Kami et al. | |
| 2013/0160907 A1 | 6/2013 | Kawabe et al. | |

(Continued)

FOREIGN PATENT DOCUMENTS

| | | |
|---|---|---|
| JP | 2004250774 A | 9/2004 |
| JP | 2005213603 A | 8/2005 |
| JP | 2007070661 A | 3/2007 |

(Continued)

OTHER PUBLICATIONS

International Search Report and Written Opinion for International Application No. PCT/JP2017/010819, dated Jun. 20, 2016—5 pages.

*Primary Examiner* — Daniel J. Schleis
(74) *Attorney, Agent, or Firm* — RatnerPrestia

(57) ABSTRACT

Provided are a coated steel sheet and so forth, the coated steel sheet having a tensile strength of 590 MPa or more and good stretch-flangeability. The coated steel sheet includes a specific component composition, in which the area fraction of a ferrite phase is 80% or more and 98% or less, the area fraction of a martensite phase of 2% or more and 15% or less, ferrite grains have an average thickness of 3.0 μm or less in the sheet-thickness direction, the martensite phase has an average grain size of 2.0 μm or less, and a Nb-containing carbide precipitated in the ferrite grains has an average grain size of 8 nm or less, and in which the steel sheet has a tensile strength of 590 MPa or more.

14 Claims, No Drawings

(56) References Cited

U.S. PATENT DOCUMENTS

| | | |
|---|---|---|
| 2013/0280551 A1 | 10/2013 | Kariya et al. |
| 2015/0017472 A1 | 1/2015 | Kimura et al. |

FOREIGN PATENT DOCUMENTS

| | | |
|---|---|---|
| JP | 2008174776 A | 7/2008 |
| JP | 2010013700 A | 1/2010 |
| JP | 2010126747 A | 6/2010 |
| WO | 0164967 A1 | 9/2001 |
| WO | 2012033210 A1 | 3/2012 |
| WO | 2012043863 A1 | 4/2012 |
| WO | 2013114850 A1 | 8/2013 |

* cited by examiner

STEEL SHEET, COATED STEEL SHEET, METHOD FOR PRODUCING HOT-ROLLED STEEL SHEET, METHOD FOR PRODUCING FULL HARD COLD-ROLLED STEEL SHEET, METHOD FOR PRODUCING STEEL SHEET, AND METHOD FOR PRODUCING COATED STEEL SHEET

CROSS REFERENCE TO RELATED APPLICATIONS

This is the U.S. National Phase application of PCT/JP2017/010819, filed Mar. 17, 2017, which claims priority to Japanese Patent Application No. 2016-070736, filed Mar. 31, 2016, the disclosures of these applications being incorporated herein by reference in their entireties for all purposes.

TECHNICAL FIELD OF THE INVENTION

The present invention relates to a steel sheet, a coated steel sheet, a method for producing a hot-rolled steel sheet, a method for producing a full hard cold-rolled steel sheet, a method for producing a steel sheet, and a method for producing a coated steel sheet.

BACKGROUND OF THE INVENTION

In recent years, there has been a trend toward an improvement in the fuel economy of automobiles in the entire automotive industry in order to reduce the amount of $CO_2$ emission in view of global environmental conservation. To improve the fuel economy of automobiles, it is most effective to reduce the weight of automobiles by reducing the thickness of parts used. Thus, the amounts of high-strength steel sheets used as materials for automobile parts have recently been increasing.

In general, the formability (workability) of steel sheets decreases with increasing strength, making it difficult to work steel sheets. To reduce the weight of automotive parts and so forth, steel sheets are required to have good workability in addition to high strength. Stretch flanging is an important method for forming an automotive part. Steel sheets for automobiles are required to have good stretch-flangeability. Coated steel sheets are often used for members required to have corrosion resistance. Coating defects accelerate the aging degradation of automobiles. Thus, good coating quality is also required in addition to stretch-flangeability.

Accordingly, the development of a steel sheet having high strength, good stretch-flangeability, and good coating quality is desired. Various techniques for providing high-strength steel sheets and steel sheets having good stretch-flangeability have been reported.

For example, Patent Literature 1 reports a cold-rolled steel sheet having a tensile strength of 590 MPa or more and good stretch-flangeability, the cold-rolled steel sheet having a microstructure containing, on a percent by mass basis, C: 0.03% to 0.16%, Si: 2.0% or less, Mn: 3.0% or less and/or Ni: 3.0% or less, Ti: 0.2% or less and/or Nb: 0.2% or less, Al: 0.01% to 0.1%, P: 0.1% or less, S: 0.02% or less, and N: 0.005% or less, and controlled amounts of C, Si, Mn, Ti, Nb, and Ti.

Patent Literature 2 discloses a cold-rolled steel sheet having good stretch-flangeability and a tensile strength of more than 980 MPa, the cold-rolled steel sheet containing, on a percent by mass basis, C: 0.03% to 0.2%, Si: 2% or less, Mn: 0.5% to 3%, P: 0.1% or less, S: 0.01% or less, Sol. Al: 0.01% to 0.1%, and N: 0.005% or less and having a ferrite grain size of 2.0 μm or less.

Patent Literature 3 discloses a technique for producing a steel sheet having a tensile strength of 590 MPa or more and good stretch-flangeability by controlling Mn segregation in a middle portion of the steel sheet in the thickness direction, the steel sheet containing, on a percent by mass basis, C: 0.01% or more, 0.20% or less, Si: 2.0% or less, Al: 0.010% or more and 2.0% or less, Mn: 0.5% or more and 3.0% or less, P: 0.08% or less, S: 0.010% or less, and N: 0.010% or less.

Patent Literature 4 discloses a high-strength hot-dip galvanized steel sheet having good stretch-flangeability, the steel sheet containing, on a percent by mass basis, C: 0.06% to 0.09%, Mn: 1.5% to 2.0%, P: 0.020% or less, S: 0.0030% or less, Al: 0.005% to 0.1%, N: 0.01% or less, Ti: 0.010% or more, and Nb: 0.030% or more, the total content of Ti and Nb being 0.040% to 0.100%, the particle size of a ferrite phase and a martensite phase being specified, and the shape and hardness of martensite being specified.

Patent Literature 1: Japanese Unexamined Patent Application Publication No. 2004-250774
Patent Literature 2: Japanese Unexamined Patent Application Publication No. 2005-213603
Patent Literature 3: Japanese Unexamined Patent Application Publication No. 2007-70661
Patent Literature 4: Japanese Unexamined Patent Application Publication No. 2010-126747

SUMMARY OF THE INVENTION

A steel sheet produced by the technique reported in Patent Literature 1 is assumed to have a relatively high Si content; thus, a steel sheet having good coating quality is not produced. Furthermore, a large amount of Ti is used in the technique reported in Patent Literature 1 to form coarse Ti inclusions. This causes poor edge quality by punching and stretch-flangeability, in some cases.

A steel sheet produced by the technique reported in Patent Literature 2 is also assumed to have a relatively high Si content. Furthermore, cooling to 100° C. or lower is needed during annealing. In particular, it is impossible to perform cooling to 100° C. or lower in a continuous coating line at present, and the technique reported in Patent Literature 2 has a problem of coating quality.

In the technique reported in Patent Literature 3, the forced cooling of slabs is needed. This requires large-scale equipment, and the cooling of all slabs produced is not suitable for mass production. Furthermore, the cooling rate of a (1/4)t portion (where t represents a thickness) is forced to depend on calculation; thus, calculation errors are directly linked to variations of products, and the effect of the nonuniformity of cooling on stretch-flangeability is also not negligible.

In the technique reported in Patent Literature 4, a tensile strength of 590 MPa or more is obtained owing to the specified hardness of the martensite phase, and Ti and Nb are added only in order to inhibit the coarsening of grains by the formation of carbonitrides. Thus, the coiling temperature is as high as 620° C., and the cooling rate in an annealing process is low in a high temperature range. In this case, the ferrite phase is softened to lead to a decrease in yield strength, on which importance is placed in structural members. An increase in the difference in hardness between the ferrite phase and the martensite leads to the degradation of edge quality of a punched hole; thus, a difficulty lies in stably obtaining good stretch-flangeability.

In any technical literature described above, an improvement in stretch-flangeability is forced to depend on the addition of Si, which degrades coating quality, and a special production process that requires large-scale equipment. The present invention has been accomplished in light of the foregoing circumstances and aims to provide a coated steel sheet having a tensile strength of 590 MPa or more and good stretch-flangeability, a production method therefor. The present invention also aims to provide a steel sheet required to produce the coated steel sheet having a tensile strength of 590 MPa or more and good stretch-flangeability, a method for producing a hot-rolled steel sheet required to produce the coated steel sheet, a method for producing a full hard cold-rolled steel sheet required to produce the coated steel sheet, and a method for producing a steel sheet required to produce the coated steel sheet.

To solve the foregoing problems, the inventors have conducted intensive studies on requirements for a coated steel sheet having a tensile strength of 590 MPa or more, good stretch-flangeability, and good coating quality. In the studies, because high-strength steel sheets are often used for automotive frame members, the steel sheet was designed to have high yield strength.

The coating quality is based on the premise that the respective amounts of Si and Mn added are controlled because the surface concentration of Si and Mn decreases wettability. The control of the Si content and the Mn content widely used in the related art causes a decrease in solid-solution strengthening to decrease the strength of a steel sheet.

Precipitation strengthening that disperses a fine carbide and that is effective in increasing the yield strength was used as a strengthening factor. However, it was found that in the case of using precipitation strengthening, precipitations coarsened during annealing after cold rolling to lead to a decrease in the strength of the steel sheet and a decrease in stretch-flangeability due to the coarse precipitates.

As a result of the pursuit of requirements for the inhibition of coarsening of precipitates, it was found that a reduction in coiling temperature and the control of the annealing temperature and annealing conditions were effective. However, stretch-flangeability and edge quality by punching required in the present invention were not obtained.

Studies on improvements in stretch-flangeability and edge quality by punching have revealed that the average thickness of ferrite grains in a sheet-thickness direction significantly affects them during punching. To reduce the thickness of the ferrite grains, we have focused on production conditions and have found that the control of hot-rolling conditions is important.

These findings have led to the completion of aspects of the present invention. The outline thereof will be described below.

[1] A steel sheet includes a component composition containing, on a percent by mass basis, C: 0.06% or more and 0.10% or less, Si: 0.07% or less, Mn: 1.6% or more and 2.2% or less, P: 0.03% or less, S: 0.005% or less, Al: 0.08% or less, N: 0.0100% or less, Ti: 0.015% or more and 0.035% or less, and Nb: 0.030% or more and 0.055% or less, expressions (1), (2), and (3) being satisfied, and the balance being Fe and incidental impurities, and a steel microstructure having an area fraction of a ferrite phase of 80% or more and 98% or less and an area fraction of a martensite phase of 2% or more and 15% or less, in which ferrite grains have an average thickness of 3.0 μm or less in the sheet-thickness direction, the martensite phase has an average grain size of 2.0 μm or less, and a Nb-containing carbide precipitated in the ferrite grains has an average grain size of 8 nm or less, the area fraction, the average thickness, and the average grain size being determined by microstructure observation, and in which the steel sheet has a tensile strength of 590 MPa or more, $$5.4[\% \text{ Si}] + [\% \text{ Mn}] \leq 2.2 \tag{1}$$

$$\{[\% \text{ Ti}] - 3.4[\% \text{ N}]\}/[\% \text{ Nb}] \leq 0.40 \tag{2}$$

$$[\% \text{ Ti}] - 3.4[\% \text{ N}] \geq 0 \tag{3}$$

where [% M] in expressions (1), (2), and (3) represents a content of an element M (% by mass).

[2] In the steel sheet described in [1], the component composition further contains, on a percent by mass basis, one or two or more of Cr: 0.001% or more and 0.1% or less, Ni: 0.001% or more and 1.0% or less, and V: 0.001% or more and 0.1% or less.

[3] In the steel sheet described in [1] or [2], the component composition further contains, on a percent by mass basis, 1.0% or less in total of one or more of REM, Cu, Sn, Sb, Mg, Ca, and Co.

[4] A coated steel sheet includes a coated layer on a surface of the steel sheet described in any one of [1] to [3].

[5] In the coated steel sheet described in [4], the coated layer is a hot-dip galvanized layer or a hot-dip galvannealed layer, and the coated layer contains Fe: 20.0% or less by mass, Al: 0.001% or more by mass and 1.0% or less by mass, and 0% or more by mass and 3.5% or less by mass in total of one or two or more selected from Pb, Sb, Si, Sn, Mg, Mn, Ni, Cr, Co, Ca, Cu, Li, Ti, Be, Bi, and REM, the balance being Zn and incidental impurities.

[6] A method for producing a hot-rolled steel sheet includes heating a steel having the component composition described in any one of [1] to [3] to 1,180° C. or higher and 1,300° C. or lower and subjecting the steel to hot rolling including rough rolling and finish rolling, cooling, and coiling, in which the total reduction ratio in the final pass and a pass immediately preceding the final pass in the finish rolling is 20% or more, the finishing entry temperature is 1,100° C. or lower, the finishing delivery temperature is 820° C. or higher, the time from the completion of the finish rolling to the start of cooling is within 3 seconds, the average cooling rate of the cooling is 30° C./s or more, the cooling stop temperature is 610° C. or lower, and the coiling temperature is 600° C. or lower.

[7] A method for producing a full hard cold-rolled steel sheet includes subjecting a hot-rolled steel sheet produced by the production method described in [6] to cold rolling at a cold-rolling reduction ratio of 40% or more.

[8] A method for producing a steel sheet includes subjecting a full hard cold-rolled steel sheet produced by the production method described in [7] to annealing under conditions at a dew point of −40° C. or lower in a temperature range of 600° C. or higher, an annealing temperature of 760° C. or higher and 840° C. or lower, an average cooling rate of 15° C./s or more from a cooling start temperature to 650° C., and a cooling stop temperature of 450° C. or higher and 550° C. or lower.

[9] A method for producing a coated steel sheet includes coating a steel sheet produced by the production method described in [8].

The coated steel sheet provided by aspects of the present invention has a high tensile strength (TS) of 590 MPa or more, good stretch-flangeability, good edge quality by punching, and good coating quality. The use of the coated steel sheet of the present invention for automotive parts achieves a further reduction in the weight of automotive parts.

The steel sheet of aspects of the present invention, the method for producing a hot-rolled steel sheet, the method for producing a full hard cold-rolled steel sheet, and the method for producing a steel sheet according to aspects of the present invention are used as an intermediate product or a method for producing an intermediate product in order to obtain the above excellent coated steel sheet and contribute to a reduction in the weight of automotive parts.

DETAILED DESCRIPTION OF EMBODIMENTS OF THE INVENTION

Embodiments of the present invention will be described below. The present invention is not limited to the embodiments described below.

The present invention relates to a steel sheet, a coated steel sheet, a method for producing a hot-rolled steel sheet, a method for producing a full hard cold-rolled steel sheet, a method for producing a steel sheet, and a method for producing a coated steel sheet. The relationship therebetween will first be described.

The steel sheet according to an aspect of the present invention is an intermediate product used for the production of the coated steel sheet according to an aspect of the present invention. The coated steel sheet according to an aspect of the present invention is produced from steel such as a slab through processes for producing a hot-rolled steel sheet, a full hard cold-rolled steel sheet, and a steel sheet.

The method according to an aspect of the present invention for producing a hot-rolled steel sheet is a process for producing a hot-rolled steel sheet among the foregoing processes.

The method according to an aspect of the present invention for producing a full hard cold-rolled steel sheet is a process for producing a full hard cold-rolled steel sheet from a hot-rolled steel sheet among the foregoing processes.

The method according to an aspect of the present invention for producing a steel sheet is a process for producing a steel sheet from a full hard cold-rolled steel sheet among the foregoing processes.

The method according to an aspect of the present invention for producing a coated steel sheet is a process for producing a coated steel sheet from a steel sheet among the foregoing processes.

Because of the foregoing relationship, the hot-rolled steel sheet, the full hard cold-rolled steel sheet, the steel sheet, and the coated steel sheet share a common component composition, and the steel sheet and the coated steel sheet share a common steel microstructure. Hereinafter, a common item, the steel sheet, the coated steel sheet, and the production methods will be described in this order.

<Component Composition of Hot-Rolled Steel Sheet, Full Hard Cold-Rolled Steel Sheet, Steel Sheet, and Coated Steel Sheet>

The hot-rolled steel sheet, the full hard cold-rolled steel sheet, the steel sheet, and the coated steel sheet have a component composition containing, on a percent by mass basis, C: 0.06% or more and 0.10% or less, Si: 0.07% or less, Mn: 1.6% or more and 2.2% or less, P: 0.03% or less, S: 0.005% or less, Al: 0.08% or less, N: 0.0100% or less, Ti: 0.015% or more and 0.035% or less, and Nb: 0.030% or more and 0.055% or less, the balance being Fe and incidental impurities, in which $5.4[\% Si]+[\% Mn] \leq 2.2$, which is expression (1), $\{[\% Ti]-3.4[\% N]\}/[\% Nb] \leq 0.40$, which is expression (2), and $[\% Ti]-3.4[\% N] \geq 0$, which is expression (3), are satisfied. Note that [% M] represents a content of an element M (% by mass).

The component composition may further contain, on a percent by mass basis, one or two or more of Cr: 0.001% or more and 0.1% or less, Ni: 0.001% or more and 1.0% or less, and V: 0.001% or more and 0.1% or less.

The component composition may further contain, on a percent by mass basis, 1.0% or less in total of one or more of REM, Cu, Sn, Sb, Mg, Ca, and Co.

These components will be described below. In the following description, the symbol "%" that expresses the content of an element refers to "% by mass".

C: 0.06% or More and 0.10% or Less

C is bonded to Nb to form a carbide that strengthens the steel sheet, thereby contributing to the formation of a fine martensite phase that improves edge quality by punching. To produce a steel sheet having a tensile strength of 590 MPa or more, the C content is at least 0.06% or more. If the C content is more than 0.10%, the fine martensite phase is difficult to form, thus degrading the edge quality by punching and the stretch-flangeability. The lower limit of the C content is preferably 0.07% or more. The upper limit of the C content is preferably 0.09% or less.

Si: 0.07% or Less

Si is an element that is concentrated on surfaces of the steel sheet to decrease the wettability with a coating and to degrade the coating quality. The Si content is preferably minimized as much as possible. A Si content of up to 0.07% may be acceptable in an embodiment of the present invention. Preferably, the Si content is 0.05% or less. The lower limit thereof is not particularly set and includes 0%; however, Si can be inevitably incorporated in steel in a content of 0.001% in view of the production. Thus, the lower limit is usually 0.001% or more.

Mn: 1.6% or More and 2.2% or Less

Mn is effective in contributing to an increase in strength by solid-solution strengthening and reducing the $Ac_3$ transformation point to promote the formation of the martensite phase. To form the martensite phase in an annealing temperature range where a Nb-containing carbide does not coarsen, the Mn content needs to be at least 1.6% or more. If the Mn content is more than 2.2%, Mn concentrates on the surfaces to degrade the coating quality. The lower limit of the Mn content is preferably 1.7% or more. The upper limit of the Mn content is preferably 2.1% or less.

To obtain coating quality required in the present invention, $5.4[\% Si]+[\% Mn] \leq 2.2$ needs to be satisfied. The coefficient of Si represents the effect on the wettability of surfaces of the steel sheet. If $5.4[\% Si]+[\% Mn]$ is more than 2.2, small bare spots are more likely to be formed; thus, $5.4[\% Si]+[\% Mn]$ is 2.2 or less.

P: 0.03% or Less

P is an element that segregates at grain boundaries to degrade the edge quality by punching. Thus, the P content is preferably minimized as much as possible. To avoid the foregoing problems in the present invention, the P content is 0.03% or less, preferably 0.02% or less. Although the P content is preferably minimized as much as possible, P can be inevitably incorporated in a content of 0.002% in view of the production. Thus, the lower limit of the P content is usually 0.002% or more.

S: 0.005% or Less

S is present in the form of an inclusion such as MnS in steel. The inclusion is formed into a wedge by hot rolling and cold rolling. Such a shape easily acts as a starting point of void formation to degrade the stretch-flangeability. Thus, in one embodiment of the present invention, the S content is preferably minimized as much as possible. The S content is 0.005% or less, preferably 0.003% or less. Although the S content is preferably minimized as much as possible, S can be inevitably incorporated in a content of 0.0002% in view of the production. Thus, the lower limit of the S content is usually 0.0002% or more.

Al: 0.08% or Less

In the case where Al is added as a deoxidizer at the stage of steel making, the Al content is preferably 0.01% or more. More preferably, the Al content is 0.02% or more. Al forms an oxide that degrades the stretch-flangeability. Thus, the upper limit of the Al content is 0.08%, preferably 0.07% or less.

N: 0.0100% or Less

N is bonded to Ti to form a coarse nitride. The resulting nitride adversely affects the edge quality by punching and the stretch-flangeability. Thus, the N content is preferably minimized as much as possible. The upper limit thereof is 0.0100%, preferably 0.0050% or less. Although the N content is preferably minimized as much as possible, N can be inevitably incorporated in a content of 0.0005% in view of the production. Thus, the lower limit thereof is usually 0.0005% or more.

Ti: 0.015% or More and 0.035% or Less

Ti is an element that is preferentially bonded to N rather than Nb and that is thus effective in inhibiting the formation of a Nb-containing nitride. In the case where N that is not bonded to Ti is present, a coarse Nb nitride is formed, thereby failing to obtain a target strength or microstructure. Thus, the Ti content needs to be 0.015% or more and in such a manner that [% Ti]− 3.4[% N]≥0 is satisfied. The use of an excessively high Ti content promotes the coarsening of the Nb-containing carbide; thus, the Ti content is 0.035% or less. The lower limit of the Ti content is preferably 0.017% or more. The upper limit of the Ti content is preferably 0.026% or less.

Nb: 0.030% or More and 0.055% or Less

Nb is an important element in the present invention because Nb inhibits the recrystallization of austenite during hot rolling and contributes to the refinement of the microstructure after cold rolling and annealing. To provide the effects, the Nb content needs to be at least 0.030% or more. If the Nb content is more than 0.055%, a coarse Nb-containing carbonitride cannot be dissolved during the reheating of a slab, and the Nb-carbonitride further coarsens easily during annealing. These coarse precipitates adversely affect the punching properties and stretch-flangeability; thus, the Nb content is 0.055%. The lower limit of the Nb content is preferably 0.035% or more. The upper limit of the Nb content is preferably 0.050% or less.

When the amount of Ti that is not bonded to N is increased, the Nb-containing carbide coarsens easily. Thus, {[% Ti]−3.4[% N]}/[% Nb]≤0.40 needs to be satisfied. When {[% Ti]−3.4[% N]}/[% Nb] is 0.40 or less, the particle growth of the Nb-containing carbide is inhibited to provide a steel sheet having high strength and good stretch-flangeability required in the present invention. Preferably, {[% Ti]−3.4[% N]}/[% Nb] is 0.38 or less.

The foregoing components are fundamental components of an aspect of the present invention. The component composition may further contain, on a percent by mass basis, one or two or more of Cr: 0.001% or more and 0.1% or less, Ni: 0.001% or more and 1.0% or less, and V: 0.001% or more and 0.1% or less.

Cr, Ni, and V serve to increase the strength of a steel sheet by solid-solution strengthening or precipitation strengthening. To provide the effect, the Cr content needs to be 0.001% or more when the steel sheet contains Cr, the Ni content needs to be 0.001% or more when the steel sheet contains Ni, and the V content needs to be 0.001% or more when the steel sheet contains V. The use of a Cr content of more than 0.1% results in the manifestation of an adverse effect on coating quality becomes apparent. At a Ni content of more than 1.0%, the desired area fraction and shape of the martensite phase are not obtained. The Ni content is preferably 0.1% or less. A V content of more than 0.1% results in a decrease in stretch-flangeability. When each of the Cr content, the Ni content, and the V content is less than the lower limit, the effects of aspects of the present invention are not impaired. When each of the Cr content, the Ni content, and the V content is less than the lower limit, these elements are regarded as being contained as incidental impurities.

When the component composition contains 1.0% or less in total of one or more of REM, Cu, Sn, Sb, Mg, Ca, and Co, the effects of aspects of the present invention are not impaired. Thus, the foregoing component composition may contain these elements.

Components other the foregoing components are Fe and incidental impurities.

<Steel Microstructure of Steel Sheet and Coated Steel Sheet>

The steel microstructure of the steel sheet and coated steel sheet will be described below. The steel microstructure has an area fraction of a ferrite phase of 80% or more and 98% or less and an area fraction of a martensite phase of 2% or more and 15% or less, in which ferrite grains have an average thickness of 3.0 μm or less in the sheet-thickness direction, the martensite phase has an average grain size of 2.0 μm or less, and a Nb-containing carbide precipitated in the ferrite grains has an average grain size of 8 nm or less, the area fraction, the average thickness, and the average grain size being determined by microstructure observation. The values of the area fraction, the average thickness of the ferrite grains in the sheet-thickness direction, the average grain size of the martensite phase, and the average grain size of the carbide indicate values obtained by methods described in examples.

Area Fraction of Ferrite Phase: 80% or More and 98% or Less

The present invention aims to provide a steel sheet having a tensile strength of 590 MPa or more by dispersing a Nb-containing carbide in ferrite. Larger amounts of phases other than the ferrite phase results in a broader hardness distribution between phases, leading to the manifestation of adverse effects on the stretch-flangeability and the edge quality by punching. An area fraction of the ferrite phase of more than 98% does not result in the effect of the martensite phase on an improvement in punching properties, thus failing to stably obtaining good stretch-flangeability. Accordingly, the area fraction of the ferrite phase is 80% or more and 98% or less. The lower limit of the area fraction of the ferrite phase is preferably 85% or more. The upper limit of the area fraction of the ferrite phase is preferably 96% or less.

Area Fraction of Martensite Phase: 2% or More and 15% or Less

The martensite phase has a higher hardness than the ferrite phase and thus acts as a void nucleation site due to stress concentration generated between the ferrite phase and the martensite phase during punching. By uniformly dispersing a small amount of the martensite phase, many voids generated during punching are bonded together, resulting in good edge quality by punching to improve the stretch-flangeability. The area fraction of the martensite phase required to provide the effects is 2% or more. If the area fraction of the martensite phase is more than 15%, the adverse effect of the difference in hardness between the phases on the stretch-flangeability is larger than the effect of improving the edge quality by punching, thereby degrading the stretch-flangeability. Accordingly, the area fraction of the martensite phase is 2% or more and 15% or less. The lower limit of the area fraction of the martensite phase is preferably 4% or more. The upper limit of the area fraction of the martensite phase is preferably 10% or less.

Other metal microstructures include a bainite phase, a retained austenite phase, and perlite. The bainite phase and the retained austenite phase are not formed in an embodiment of the present invention; thus, the acceptable upper limit of the area fraction thereof is preferably 1%. The area fraction of pearlite including degenerate pearlite is preferably limited to 5% or less in view of stretch-flangeability.

Average Thickness of Ferrite Grain in Sheet-Thickness Direction: 3.0 µm or Less

A crack propagates in the thickness direction of the steel sheet during punching; thus, the average thickness of the ferrite grains (the thickness of the ferrite phase) in the sheet-thickness direction is more important than the average grain size. A thickness of the ferrite phase of more than 3 µm results in nonuniform deformation of crystal grains during punching. This causes the detachment of the ferrite grain boundaries, thereby degrading the punching properties and the stretch-flangeability. Accordingly, the ferrite grains have an average thickness of 3.0 µm or less, preferably 2.0 µm or less. The standard deviation of the thickness of the ferrite grains is preferably 0.5 µm or less. The lower limit of the average thickness of the ferrite grains is not particularly limited. In embodiment of the present invention, the average thickness of the ferrite grains is usually down to 0.5 µm. Thus, the lower limit thereof is usually 0.5 µm or more.

Average Thickness of Martensite Phase: 2.0 µm or Less

If the martensite phase has an average grain size of more than 2.0 µm, the martensite phase is sparsely dispersed to inhibit the linking of the voids during punching, thereby degrading the edge quality by punching and the stretch-flangeability. Thus, the martensite phase has an average grain size of 2.0 µm, preferably 1.5 µm or less. The lower limit of the average grain size of the martensite phase is not particularly limited and is usually 0.1 µm or more. To promote the linking of the voids, the average distance between the nearest martensite phases is preferably 1.0 µm or less. The lower limit of the average distance is not particularly limited and is usually 0.1 µm or more.

Average Particle Size of Nb-Containing Carbide Precipitated in Ferrite Grain: 8 nm or Less In the present invention, most of strength is obtained by the precipitation strengthening of the Nb-containing carbide. An average particle size of more than 8 nm does not result in a tensile strength of 590 MPa or more, thus decreasing the yield strength or degrading the edge quality by punching and the stretch-flangeability. In the case where the steel sheet is used for automotive frame members, the yield ratio (=yield strength/tensile strength) is preferably 0.70 or more. Accordingly, the Nb-containing carbide has an average particle size of 8 nm or less, preferably 6 nm or less. Although the lower limit is not particularly set, the minimum size of the carbide in an embodiment of the present invention is usually 1 nm or more.

<Steel Sheet>

The component composition and the steel microstructure of the steel sheet are as described above. The thickness of the steel sheet is usually, but not particularly limited to, 0.1 mm or more and 3.2 mm or less.

<Coated Steel Sheet>

The coated steel sheet according to an embodiment of the present invention is a coated steel sheet including a coated layer on the steel sheet according to an embodiment of the present invention. The type of the coated layer is not particularly limited. For example, the coated layer may be a hot-dip coated layer or an electroplated layer. The coated layer may be an alloyed coated layer. The coated layer is preferably a galvanized layer. The galvanized layer may contain Al and Mg. In addition, hot-dip zinc-aluminum-magnesium alloy coating (a Zn—Al—Mg coated layer) is also preferred. In this case, the coated layer preferably has an Al content of 1% or more by mass and 22% or less by mass and a Mg content of 0.1% or more by mass and 10% or less by mass, the remainder being Zn. In addition to Zn, Al, and Mg, the Zn—Al—Mg coated layer may contain 1% or less by mass in total of one or more selected from Si, Ni, Ce, and La. The coating metal is not particularly limited. Thus, for example, an Al coating other than the Zn coating as described above may be used. The coating metal is not particularly limited. Thus, for example, an Al coating other than the Zn coating as described above may be used.

The composition of the coated layer is not particularly limited. A common component may be used. For example, in the case of a hot-dip galvanized layer or a hot-dip galvannealed layer, the coated layer is a hot-dip galvanized layer or a hot-dip galvannealed layer containing, on a percent by mass basis, Fe: 20.0% or less by mass, Al: 0.001% or more by mass and 1.0% or less by mass, and 0% or more by mass and 3.5% or less by mass in total of one or two or more selected from Pb, Sb, Si, Sn, Mg, Mn, Ni, Cr, Co, Ca, Cu, Li, Ti, Be, Bi, and REM, the balance being Zn and incidental impurities. Usually, the hot-dip galvanized layer has an Fe content of 0 to 5.0% by mass, and the hot-dip galvannealed steel sheet has an Fe content of more than 5.0% by mass and 20.0% or less by mass.

<Method for Producing Hot-Rolled Steel Sheet>

The method according to an embodiment of the present invention for producing a hot-rolled steel sheet includes heating a steel having the component composition described in Section <Component Composition of Hot-Rolled Steel Sheet, Full Hard Cold-Rolled Steel Sheet, Steel Sheet, and Coated Steel Sheet> described above to 1,180° C. or higher and 1,300° C. or lower and subjecting the steel to hot rolling including rough rolling and finish rolling, in which the total reduction ratio in the final pass and a pass immediately preceding the final pass in the finish rolling is 20% or more, the finishing entry temperature is 1,100° C. or lower, the finishing delivery temperature is 820° C. or higher, cooling is started within 3 seconds after the completion of the finish rolling at an average cooling rate of 30° C./s or more and stopped at a cooling stop temperature of 610° C. or less, and performing coiling at a coiling temperature of 600° C. or lower. These conditions will be described below. In the following description, the temperature indicates the surface temperature of the steel sheet unless otherwise specified. The surface temperature of the steel sheet can be measured with, for example, a radiation thermometer. The average cooling rate indicates ((surface temperature before cooling−surface temperature after cooling)/cooling time).

Production of Steel

A steelmaking method for the production of the steel described above is not particularly limited, and a known steelmaking method using, for example, a converter or an electric furnace may be employed. Secondary refining may be performed in a vacuum degassing furnace. Then a slab (steel) is preferably formed by a continuous casting process in view of productivity and quality. The slab may also be formed by a known casting process such as an ingot-casting and slabbing-rolling process or a thin slab continuous casting process.

Heating Temperature of Steel: 1,180° C. or Higher and 1,300° C. or Lower

In an embodiment of the present invention, the steel needs to be heated to form the steel microstructure of the steel into a substantially uniform austenite phase before the rough rolling. To inhibit the formation of coarse inclusions, the control of the heating temperature is important. If the heating temperature is lower than 1,180° C., a desired finishing entry temperature and a desired finishing delivery temperature cannot be obtained. Furthermore, a carbonitride containing Ti or Nb cannot be dissolved, and the coarse carbonitride degrades the stretch-flangeability. If the heating temperature is higher than 1,300° C., scale loss is increased to increase damage to the furnace body of a furnace. Accordingly, the heating temperature of the steel is 1,180° C. or higher and 1,300° C. or lower. The lower limit of the heating temperature is preferably 1,200° C. or higher. The upper limit of the heating temperature is preferably 1,260° C. or lower. Rough-rolling conditions after the heating are not particularly limited.

Total Reduction Ratio in Final Pass and Pass Immediately Preceding Final Pass: 20% or More Finishing Entry Temperature: 1,100° C. or Lower Finishing Delivery Temperature: 820° C. or Higher In the finish rolling, an elongated work-hardened austenite microstructure needs to be formed by the application of a high reduction ratio while the recrystallization of austenite is inhibited. This reduces the thickness of the ferrite phase after annealing and refines and uniformly disperses the martensite phase. To this end, the finish rolling needs to be performed at a total reduction ratio in the final pass and the pass immediately preceding the final pass of 20% or more and a finishing entry temperature of 1,100° C. or lower. Here, the reason the total reduction ratio in the final pass and the pass immediately preceding the final pass is 20% or more is that a large amount of strain needs to be applied in a low-temperature region where the lowest transformation speed to austenite is obtained. When a large amount of strain is applied only in the final pass in the finish rolling, the sheet shape is degraded, in some cases. To form a desired steel microstructure, thus, the total reduction ratio in the final pass and the pass immediately preceding the final pass is 20% or more, preferably 22% or more. A finishing entry temperature of higher than 1,100° C. results in the progression of the recrystallization of austenite, thus failing to form a desired elongated work-hardened austenite microstructure. A finishing delivery temperature of lower than 820° C. results in the initiation of transformation from austenite to ferrite at a high temperature to allow the particles of a Nb-containing carbide formed at the time of ferrite transformation to grow, thereby failing to obtain a desired particle size of the Nb-containing carbide. The preferred lower limits of finish-rolling conditions are as follows: a total reduction ratio of 82% or more at a temperature of the finish rolling (820° C. or higher and 1,100° C. or lower), a finishing entry temperature of 1,020° C. or higher, and a finishing delivery temperature of 840° C. or higher. The preferred upper limits of the finish-rolling conditions are as follows: the total reduction ratio of 95% or less at a temperature of the finish rolling (820° C. or higher and 1,100° C. or lower), a finishing entry temperature of 1,080° C. or less, and a finishing delivery temperature of 920° C. or less.

Cooling to 610° C. or Lower at Average Cooling Rate of 30° C./s or More within 3 Seconds The initiation of ferrite transformation at a high temperature precipitates a coarse Nb-containing carbide to decrease the strength of the steel sheet and to fail to obtain a desired thickness of the ferrite phase, thus adversely affecting the stretch-flangeability. Accordingly, cooling needs to be performed to a cooling stop temperature of 610° C. or lower at an average cooling rate of 30° C./s or more within 3 seconds after the completion of the finish rolling. Preferred cooling conditions are as follows: cooling is performed to 600° C. or lower at an average cooling rate of 35° C./s or more within 2 seconds. The average cooling rate is preferably 150° C./s or less from the viewpoint of inhibiting variations in coiling temperature. The cooling stop temperature is preferably 590° C. or higher because of the inhibition of ferrite grain growth.

It is important that the average cooling rate until 610° C. is 30° C./s or more. Thus, cooling from 610° C. to the coiling temperature may be performed at a cooling rate of less than 30° C./s.

The cooling stop temperature, may be or may not be equal to the coiling temperature. When the cooling stop temperature is not equal to the coiling temperature, for example, when the coiling temperature is set to be lower than the cooling stop temperature, the temperature of the steel sheet may be lowered to a desired coiling temperature by, for example, performing further air cooling after the stop of the cooling.

Coiling Temperature: 600° C. or Lower

A coiling temperature of higher than 600° C. results in the coarsening of the Nb-containing carbide to fail to obtain a desired carbide. Preferably, the coiling temperature is 400° C. or higher and 580° C. or lower. The lower limit of the preferred coiling temperature is a value determined from the viewpoint of the sheet shape during or after the cooling.

After the coiling, the steel sheet is cooled by, for example, air cooling and then is used for the production of the full hard cold-rolled steel sheet described below. In the case where the hot-rolled steel sheet is treated as merchandise to be sold as an intermediate product, usually, the hot-rolled steel sheet in a state of being cooled after the coiling is treated as merchandise to be sold.

<Method for Producing Full Hard Cold-Rolled Steel Sheet>

The method for producing a full hard cold-rolled steel sheet is a method for producing a full hard cold-rolled steel sheet by subjecting a hot-rolled steel sheet produced by the foregoing production method to cold rolling.

Cold-Rolling Reduction Ratio: 40% or More

In the cold rolling, the reduction ratio needs to be set to 40% or more. The microstructure of the hot-rolled steel sheet transformed from work-hardened austenite is further elongated by the cold rolling, thereby providing a desired thickness of the ferrite phase and the fine martensite phase. Thus, the cold-rolling reduction ratio is 40% or more. The lower limit of the reduction ratio is preferably 50% or more. The upper limit of the reduction ratio is preferably 95% or less.

Pickling may be performed before the cold rolling. Pickling conditions may be appropriately set.

<Method for Producing Steel Sheet>

The method of the present invention for producing a steel sheet is a method that includes subjecting a full hard cold-rolled steel sheet produced by the production method described above to annealing under conditions at a dew point of −40° C. or lower in a temperature range of 600° C. or higher, an annealing temperature of 760° C. or higher and 840° C. or lower, an average cooling rate of 15° C./s or more from the cooling start temperature to 650° C., and a cooling stop temperature of 450° C. or higher and 550° C. or lower.

Dew Point in Temperature Range of 600° C. or Higher: −40° C. or Lower

Setting the dew point in a temperature range of 600° C. or higher to −40° C. or lower can inhibit decarbonization from the surfaces of the steel sheet during the annealing to stably produce the steel sheet having a tensile strength of 590 MPa or more specified in an embodiment of the present invention. If the dew point in the foregoing temperature is higher than −40° C., the steel sheet has a strength of less than 590 MPa because of the decarbonization, in some cases. Thus, the dew point in the temperature range of 600° C. or higher is −40° C. or lower. The lower limit of the dew point of an atmosphere is preferably, but not particularly limited to, −80° C. or higher because the effect is saturated at lower than −80° C., facing a cost disadvantage. The temperature in the temperature range is based on the surface temperature of the steel sheet. That is, when the surface temperature of the steel sheet is in the temperature range described above, the dew point is adjusted in the range described above.

Annealing Temperature: 760° C. or Higher and 840° C. or Lower

It is important that, in the annealing, recrystallization is performed in the range where the particles of the Nb-containing carbide do not grow. To obtain a recrystallized microstructure, it is necessary to perform heating to at least 760° C. or higher. An annealing temperature of higher than 840° C. results in the coarsening of the Nb-containing carbide to fail to a desired microstructure of the steel sheet. The lower limit of the annealing temperature is preferably 770° C. or higher. The upper limit of the annealing temperature is preferably 830° C. or lower.

Average Cooling Rate from Cooling Start Temperature to 650° C.: 15° C./s or Higher After the completion of the recrystallization, the growth of particles of the Nb-containing carbide needs to be inhibited during a cooling stage. When the steel sheet is held at 650° C. or higher for long periods of time, Nb is dispersed to grow the particles. To avoid this problem, the steel sheet needs to be cooled to 650° C. at an average cooling rate of 15° C./s or more, preferably 18° C./s or more. Unlike cooling to 610° C. or lower under the hot-rolling conditions, the reason for cooling to 650° C. or lower during the annealing is that because the cold-rolled steel sheet is thinner than the hot-rolled steel sheet, the cooling under the hot-rolling conditions need not be performed in view of a large decrease in temperature due to air cooling. Thus, the average cooling rate may be less than 30° C./s.

The cooling start temperature is the annealing temperature and thus may be 760° C. or higher and 840° C. or lower.

Cooling in which Cooling Stop Temperature is 450° C. or Higher and 550° C. or Lower After the cooling to 650° C., the temperature of the steel sheet needs to be controlled in order to promote ferrite transformation and refine the martensite phase. A cooling stop temperature of lower than 450° C. results in excessive formation of a coarse martensite phase to decrease the yield ratio and to degrade the punching properties and the stretch-flangeability. A cooling stop temperature of higher than 550° C. results in the coarsening of the Nb-containing carbide to decrease the strength, thus failing to provide the steel sheet having a tensile strength of 590 MPa or more. Accordingly, the steel sheet is cooled to a temperature range of 450° C. or higher and 550° C. or lower. The lower limit of the cooling stop temperature is preferably 460° C. or higher. The upper limit of the cooling stop temperature is preferably 540° C. or lower.

The average cooling rate in the cooling from 650° C. to a temperature of 450° C. or higher and 550° C. or lower is not particularly limited and may or may not be 15° C./s or more, which is the same as that in the range of the cooling start temperature to 650° C. Usually, the average cooling rate is 2° C./s or more and 100° C./s or less.

In the case where the steel sheet is treated as merchandise to be sold, usually, the steel sheet that is cooled to room temperature after cooling to a cooling stop temperature of 450° C. or higher and 550° C. or lower or after temper rolling is treated as merchandise to be sold.

<Method for Producing Coated Steel Sheet>

The method according to an embodiment of the present invention for producing a coated steel sheet is a method for producing a coated steel sheet by subjecting the steel sheet produced as described above to coating. The type of a coating method is not particularly limited. The coating method may be hot-dip coating, electroplating, or the like. Specifically, a coated layer may be formed by hot-dip galvanizing treatment or treatment in which alloying is performed after hot-dip galvanization. A coated layer may be formed by electroplating such as Zn—Ni alloy electroplating. Hot-dip zinc-aluminum-magnesium alloy coating may be performed. The term "coating" includes the case of performing hot-dip coating treatment and then alloying treatment. The following description is made by taking the hot-dip galvanization as an example.

The hot-dip coating is performed by a method in which a steel sheet is immersed in a coating bath. In this method, the temperature of the steel sheet (thin steel sheet) to be immersed in the coating bath needs to be adjusted to 450° C. or higher and 550° C. or lower. At a temperature outside the temperature range of 450° C. to 550° C., foreign matter is formed in the coating bath, and the temperature of the coating bath cannot be controlled. Thus, the steel sheet is adjusted so as to have a temperature of 450° C. or higher and 550° C. or lower. The lower limit of the temperature is preferably 460° C. or higher. The upper limit of the temperature is preferably 540° C. or lower.

After the hot-dip coating, alloying treatment may be performed, as needed. The treatment temperature and the treatment time in the alloying treatment are not particularly limited and may be appropriately set.

As described in the explanation of the coating layer, Zn coating is preferred. However, coating treatment using another metal, such as Al coating, may be used.

After a steel sheet is produced in a continuous hot-dip coating line, a coated steel sheet may be immediately produced using the steel sheet.

Example 1

Steels having component compositions given in Table 1 and having a thickness of 250 mm were subjected to hot rolling under hot-rolling conditions given in Table 2 to form hot-rolled steel sheets. The hot-rolled steel sheets were subjected to cold rolling under cold-rolling conditions given in Table 2 to form full hard cold-rolled steel sheets. The cold-rolled steel sheets were subjected to annealing under annealing conditions given in Table 2 in a continuous hot-dip coating line. Then coating treatment and, as needed, alloying treatment were performed. A coating bath (coating composition: Zn-0.13% by mass Al) used in the continuous hot-dip coating line had a temperature of 460° C. The GI materials (hot-dip coated steel sheets) and the GA materials (hot-dip alloy-coated steel sheets) each had a coating weight of 45 g/m² or more and 65 g/m² or less per side. In the case of a hot-dip galvannealed layer, the galvannealed layer had an Fe content of 6% or more by mass and 14% or less by mass. In the case of a hot-dip galvanized layer, the galvanized layer had an Fe content of 4% or less by mass.

TABLE 1

| Steel No. | Component composition (% by mass) | | | | | | | | | | Expression (1) | Expression (2) | Expression (3) | Remarks |
|---|---|---|---|---|---|---|---|---|---|---|---|---|---|---|
| | C | Si | Mn | P | S | Al | N | Ti | Nb | Others | | | | |
| A | 0.07 | 0.05 | 1.85 | 0.01 | 0.003 | 0.05 | 0.0046 | 0.021 | 0.047 | — | 2.12 | 0.11 | 0.005 | Example |
| B | 0.09 | 0.03 | 2.01 | 0.01 | 0.001 | 0.05 | 0.0044 | 0.025 | 0.038 | REM: 0.002 Co: 0.001 Ca: 0.001 | 2.17 | 0.26 | 0.010 | Example |
| C | 0.07 | 0.03 | 1.93 | 0.02 | 0.003 | 0.05 | 0.0044 | 0.022 | 0.042 | Cu: 0.03 Ni: 0.05 Cr: 0.04 Sb: 0.008 | 2.09 | 0.17 | 0.007 | Example |
| D | 0.10 | 0.04 | 1.85 | 0.02 | 0.003 | 0.04 | 0.0047 | 0.025 | 0.046 | V: 0.05 Mg: 0.001 Sn: 0.001 | 2.07 | 0.20 | 0.009 | Example |
| E | 0.03 | 0.02 | 1.88 | 0.01 | 0.002 | 0.04 | 0.0030 | 0.024 | 0.049 | | 1.99 | 0.28 | 0.014 | Comparative example |
| F | 0.15 | 0.03 | 2.09 | 0.02 | 0.001 | 0.04 | 0.0030 | 0.018 | 0.045 | | 2.25 | 0.17 | 0.008 | Comparative example |
| G | 0.08 | 0.15 | 2.03 | 0.02 | 0.002 | 0.04 | 0.0047 | 0.020 | 0.049 | — | 2.84 | 0.08 | 0.004 | Comparative example |
| H | 0.09 | 0.04 | 1.20 | 0.02 | 0.003 | 0.04 | 0.0027 | 0.024 | 0.038 | — | 1.42 | 0.39 | 0.015 | Comparative example |
| I | 0.08 | 0.05 | 2.30 | 0.01 | 0.002 | 0.04 | 0.0044 | 0.019 | 0.035 | — | 2.57 | 0.12 | 0.004 | Comparative example |
| J | 0.09 | 0.01 | 1.99 | 0.01 | 0.002 | 0.04 | 0.0044 | 0.060 | 0.042 | — | 2.04 | 1.07 | 0.045 | Comparative example |
| K | 0.07 | 0.02 | 2.00 | 0.02 | 0.002 | 0.05 | 0.0038 | 0.026 | 0.010 | — | 2.11 | 1.31 | 0.013 | Comparative example |
| L | 0.07 | 0.04 | 1.95 | 0.01 | 0.002 | 0.03 | 0.0030 | 0.022 | 0.090 | — | 2.17 | 0.13 | 0.012 | Comparative example |
| M | 0.07 | 0.05 | 2.18 | 0.01 | 0.002 | 0.03 | 0.0038 | 0.023 | 0.042 | — | 2.45 | 0.24 | 0.010 | Comparative example |
| N | 0.09 | 0.03 | 1.90 | 0.02 | 0.003 | 0.04 | 0.0030 | 0.035 | 0.035 | — | 2.06 | 0.71 | 0.025 | Comparative example |
| O | 0.07 | 0.04 | 1.81 | 0.01 | 0.001 | 0.03 | 0.0056 | 0.016 | 0.035 | — | 2.03 | −0.09 | −0.003 | Comparative example |

Expression (1): $5.4[\% Si] + [\% Mn] \leq 2.2$
Expression (2): $\{[\% Ti] - 3.4[\% N]\}/[\% Nb] \leq 0.40$
Expression (3): $[\% Ti] - 3.4[\% N] \geq 0$

TABLE 2

| Steel sheet No. | Steel | Hot rolling | | | | | | | |
|---|---|---|---|---|---|---|---|---|---|
| | | Slab heating temperature (° C.) | Total reduction ratio in finish rolling (%) *1 | Finishing entry temperature (° C.) | Finishing delivery temperature (° C.) | Cooling start time (s) *2 | Coiling rate (° C./s) *3 | Cooling stop temperature (° C.) | Cooling temperature (° C.) |
| 1 | A | 1240 | 31 | 1070 | 870 | 1.0 | 65 | 589 | 580 |
| 2 | | 1230 | 28 | 1050 | 850 | 1.0 | 45 | 538 | 530 |
| 3 | | 1190 | 15 | 1080 | 900 | 0.6 | 60 | 479 | 470 |
| 4 | | 1210 | 27 | 1160 | 920 | 1.5 | 65 | 535 | 520 |
| 5 | | 1190 | 24 | 1070 | 800 | 0.7 | 50 | 570 | 560 |
| 6 | | 1190 | 22 | 1070 | 880 | 3.6 | 60 | 588 | 580 |
| 7 | | 1230 | 26 | 1050 | 840 | 1.1 | 15 | 480 | 470 |
| 8 | | 1240 | 32 | 1060 | 900 | 1.3 | 45 | 654 | 650 |
| 9 | | 1240 | 29 | 1060 | 880 | 1.1 | 40 | 495 | 490 |
| 10 | | 1240 | 32 | 1060 | 860 | 1.7 | 45 | 588 | 580 |
| 11 | | 1230 | 24 | 1060 | 890 | 1.3 | 40 | 480 | 470 |
| 12 | | 1240 | 25 | 1070 | 880 | 1.2 | 45 | 477 | 470 |
| 13 | B | 1200 | 24 | 1060 | 900 | 1.5 | 45 | 541 | 530 |
| 14 | | 1220 | 22 | 1030 | 850 | 1.5 | 45 | 497 | 490 |
| 15 | C | 1190 | 28 | 1050 | 850 | 1.1 | 55 | 530 | 520 |
| 16 | | 1260 | 31 | 1050 | 900 | 0.6 | 60 | 476 | 470 |
| 17 | D | 1220 | 32 | 1070 | 870 | 0.7 | 65 | 484 | 480 |
| 18 | E | 1240 | 27 | 1040 | 880 | 1.9 | 65 | 488 | 480 |
| 19 | F | 1200 | 27 | 1040 | 840 | 0.8 | 65 | 588 | 580 |
| 20 | G | 1250 | 25 | 1080 | 880 | 1.9 | 60 | 533 | 520 |
| 21 | H | 1230 | 22 | 1080 | 860 | 1.9 | 35 | 475 | 460 |
| 22 | I | 1250 | 25 | 1070 | 880 | 1.9 | 40 | 556 | 550 |
| 23 | J | 1200 | 27 | 1040 | 880 | 0.9 | 60 | 456 | 450 |
| 24 | K | 1190 | 23 | 1060 | 850 | 0.6 | 65 | 458 | 450 |
| 25 | L | 1230 | 24 | 1040 | 890 | 0.8 | 50 | 471 | 460 |

TABLE 2-continued

| 26 | M | 1190 | 24 | 1080 | 900 | 1.3 | 50 | 457 | 450 |
| 27 | N | 1250 | 32 | 1080 | 840 | 1.1 | 35 | 584 | 570 |
| 28 | O | 1250 | 32 | 1050 | 920 | 1.9 | 65 | 475 | 460 |
| 29 | A | 1240 | 32 | 1050 | 860 | 0.9 | 50 | 581 | 575 |

| Steel sheet No. | Cold rolling reduction ratio (%) | Dew point in temperature range of 600° C. or higher (° C.) | Annealing temperature (° C.) | Cooling rate (° C./s) *4 | Cooling stop temperature (° C.) | Alloying temperature (° C.) | Remarks |
|---|---|---|---|---|---|---|---|
| 1 | 72 | −45 | 817 | 27 | 515 | — | Example |
| 2 | 71 | −45 | 803 | 30 | 510 | 530 | Example |
| 3 | 77 | −46 | 787 | 19 | 521 | 520 | Comparative example |
| 4 | 51 | −45 | 821 | 19 | 465 | 520 | Comparative example |
| 5 | 54 | −46 | 819 | 25 | 472 | 500 | Comparative example |
| 6 | 66 | −45 | 821 | 21 | 506 | 500 | Comparative example |
| 7 | 65 | −47 | 805 | 30 | 518 | 520 | Comparative example |
| 8 | 80 | −45 | 795 | 29 | 530 | 510 | Comparative example |
| 9 | 37 | −45 | 780 | 19 | 480 | 520 | Comparative example |
| 10 | 70 | −43 | 852 | 24 | 477 | 520 | Comparative example |
| 11 | 69 | −45 | 793 | 10 | 472 | 530 | Comparative example |
| 12 | 65 | −42 | 816 | 22 | 358 | — | Comparative example |
| 13 | 56 | −49 | 823 | 25 | 518 | — | Example |
| 14 | 57 | −50 | 811 | 20 | 494 | 510 | Example |
| 15 | 57 | −49 | 794 | 21 | 500 | — | Example |
| 16 | 65 | −48 | 823 | 18 | 516 | 540 | Example |
| 17 | 56 | −55 | 782 | 27 | 526 | — | Example |
| 18 | 69 | −45 | 816 | 18 | 481 | 530 | Comparative example |
| 19 | 70 | −49 | 781 | 19 | 525 | 530 | Comparative example |
| 20 | 70 | −45 | 798 | 18 | 466 | 530 | Comparative example |
| 21 | 73 | −40 | 820 | 30 | 517 | 540 | Comparative example |
| 22 | 59 | −42 | 782 | 27 | 530 | 510 | Comparative example |
| 23 | 80 | −41 | 796 | 25 | 486 | 520 | Comparative example |
| 24 | 55 | −45 | 811 | 24 | 491 | 510 | Comparative example |
| 25 | 69 | −43 | 796 | 26 | 488 | 500 | Comparative example |
| 26 | 62 | −43 | 804 | 28 | 524 | 510 | Comparative example |
| 27 | 69 | −42 | 825 | 29 | 466 | 500 | Comparative example |
| 28 | 76 | −45 | 792 | 29 | 465 | 510 | Comparative example |
| 29 | 67 | −38 | 820 | 28 | 515 | 530 | Comparative example |

*1 The total reduction ratio in final pass and pass immediately preceding final pass
*2 Time from completion of finish rolling to start of cooling
*3 Average cooling rate until 610° C. after lapse of cooling start time
*4 Average cooling rate from cooling start temperature (annealing temperature) to 650° C.

Test pieces were sampled from the hot-dip coated steel sheets or the hot-dip alloy-coated steel sheets produced as described above and evaluated by methods described below.

(i) Microstructure Observation

The area fractions of phases were evaluated by a method described below. A test piece was cut out from each of the steel sheets in such a manner that a section of the test piece in the sheet-thickness direction, the section being parallel to the rolling direction, was an observation surface. The central portion thereof in the sheet-thickness direction was etched with 1% nital. Images of 10 fields of view of a portion of each steel sheet were photographed with a scanning electron microscope at a magnification of 2,000×, the portion being located away from a surface of the sheet by ¼ of the thickness of the sheet. A ferrite phase is a microstructure in which corrosion marks and cementite are not observed in grains. A martensite phase is a microstructure in which no carbide is observed in the grains and which appears as white grains. The ferrite phase and the martensite phase were isolated from each other by image analysis, and the area fractions thereof were determined with respect to the field of view. A phase other than the ferrite phase or martensite phase was pearlite.

Regarding the thickness of the ferrite phase, the maximum lengths of 300 randomly-selected ferrite grains in the sheet-thickness direction were determined and defined as the thicknesses of the ferrite grains in the sheet-thickness direction. The average length of the 300 grains is presented in Table 3 as the thickness of the ferrite grains. The standard deviation of the ferrite thickness in the sheet-thickness direction was calculated and is presented in Table 3.

The average grain size of the martensite phase was measured as follows: 300 martensite grains were randomly selected. The equivalent circle diameters of areas of the martensite-phase grains photographed with a scanning electron microscope were determined. The average value thereof was presented in Table 3. For the 300 martensite grains, the shortest distance between the nearest martensite grains (the shortest distance between grain boundaries) was determined. The average value for the 300 grains is presented in Table 3 as the distance between the martensite grains.

Observation of a carbide was performed as follows: The middle portion of the steel sheet in the sheet-thickness direction was defined as an observation object and magnified to a magnification of 300,000× with a transmission electron microscope. Precipitates observed were analyzed using an energy-dispersive X-ray spectrometer equipped with the TEM to identify a Nb-containing carbide. The equivalent circle diameters of the areas of 300 Nb-containing carbide particles on a photograph taken with the transmission electron microscope were determined. The average value thereof was presented in Table 3.

(ii) Tensile Test

A JIS No. 5 tensile test piece was prepared from each of the resulting steel sheets in a direction perpendicular to the rolling direction. A tensile test according to JIS Z 2241 (2011) was performed five times. The average yield strength (YS), the tensile strength (TS), and the total elongation (El) were determined. The cross-head speed was 10 ram/min in the tensile test. In Table 3, the steel sheets having a tensile strength of 590 MPa or more were regarded as steel sheets having mechanical properties required in an aspect of the present invention.

(iii) Punching Test

A punching test was performed five times at a diameter of 10 mm and a clearance of 12.5%, and the edge quality was observed. When a crack having a size of 0.5 mm or more was observed on the edge, the steel sheet was evaluated as "x (Failed)", and when a crack having a size of 0.5 mm or more was not observed, the steel sheet was evaluated as acceptable and denoted by "0 (Good)".

(iV) Hole Expansion Test

Test pieces that had been subjected to punching to form holes with a diameter of 10 mm (D0) were produced according to Japan Iron and Steel Federation Standard (JFST) 1001. Each of the holes was enlarged by pressing a conical punch having a cone angle of 60° thereinto. The hole diameter D (mm) immediately after a crack on the sheared edge propagated through the sheet in the sheet-thickness direction was determined, and a hole expansion ratio ($\lambda$) obtained by an expression below was evaluated.

$$\lambda = \{(D-D0)/D0\} \times 100\%$$

The stretch-flangeability of the test piece in which the $\lambda$ value was 80% or more and the shear edge was evaluated as good was evaluated as acceptable and denoted by "○ (Good)". The stretch-flangeability of the test piece in which the $\lambda$ value was less than 80% or the shear edge was evaluated as unacceptable was evaluated as "x (Failed)". However, because the steel sheets having good edge quality by punching stably had a $\lambda$ value of 90% or more, $\lambda$ is preferably in the range of 90% or more.

(v) Coating Quality

Ten samples having a width of 800 mm and a length of 500 mm were taken. The presence or absence of bare spots (five or more bare spots, having an equivalent circle diameter of 0.2 mm or more, per square meter) on surfaces of the steel sheets was checked visually and with a loupe with a magnification of 10×. When the bare spots were not observed, the steel sheet was evaluated as acceptable and denoted by "0 (Good)". When the bare spots were observed, the steel sheet was evaluated as unacceptable and denoted by "x (Failed)".

Table 3 lists the results.

TABLE 3

| | | Microstructure of steel | | | | | | Mechanical properties of steel sheet | |
|---|---|---|---|---|---|---|---|---|---|
| Steel sheet No. | Surface state | Area fraction of ferrite (%) | Area fraction of martensite (%) | Average thickness of ferrite in thickness direction of sheet (μm) | Standard deviation of ferrite thickness (μm) | Grain size of martensite phase (μm) | Distance between martensite grains (μm) | Carbide grain size (nm) | Yield strength (MPa) | Tensile strength (MPa) |
| 1 | GI material | 91 | 7 | 1.1 | 0.1 | 0.7 | 0.7 | 6 | 461 | 623 |
| 2 | GA material | 94 | 4 | 1.1 | 0.2 | 1.4 | 0.8 | 5 | 440 | 611 |
| 3 | GA material | 91 | 6 | 3.6 | 0.5 | 2.1 | 1.3 | 3 | 451 | 594 |
| 4 | GA material | 91 | 8 | 3.3 | 0.7 | 1.9 | 1.2 | 5 | 472 | 629 |
| 5 | GA material | 89 | 11 | 1.3 | 0.5 | 1.1 | 0.7 | 12 | 354 | 528 |
| 6 | GA material | 87 | 11 | 2.0 | 0.3 | 1.6 | 0.8 | 9 | 399 | 578 |
| 7 | GA material | 96 | 3 | 0.9 | 0.4 | 0.9 | 0.9 | 9 | 388 | 571 |
| 8 | GA material | 93 | 6 | 3.2 | 0.4 | 0.8 | 0.2 | 10 | 400 | 580 |
| 9 | GA material | 95 | 3 | 3.7 | 0.8 | 2.1 | 1.1 | 5 | 473 | 639 |
| 10 | GA material | 79 | 21 | 2.7 | 0.8 | 2.3 | 1.8 | 12 | 396 | 591 |
| 11 | GA material | 99 | 0 | 3.4 | 1.2 | — | — | 13 | 389 | 518 |
| 12 | GI material | 58 | 42 | 1.2 | 0.6 | 5.8 | — | 4 | 428 | 668 |
| 13 | GI material | 93 | 4 | 1.3 | 0.3 | 0.6 | 0.5 | 3 | 462 | 624 |
| 14 | GA material | 87 | 13 | 1.3 | 0.3 | 0.7 | 0.4 | 6 | 463 | 626 |
| 15 | GI material | 95 | 4 | 1.1 | 0.1 | 0.5 | 0.3 | 6 | 460 | 613 |
| 16 | GA material | 95 | 4 | 1.0 | 0.4 | 1.2 | 0.4 | 5 | 436 | 605 |
| 17 | GA material | 93 | 4 | 1.6 | 0.1 | 1.5 | 0.9 | 4 | 471 | 637 |
| 18 | GA material | 100 | 0 | 3.9 | 1.4 | — | — | 7 | 255 | 418 |
| 19 | GA material | 75 | 25 | 1.9 | 0.4 | 3.1 | 0.7 | 4 | 573 | 796 |
| 20 | GA material | 92 | 5 | 1.2 | 0.3 | 0.6 | 0.2 | 4 | 476 | 626 |
| 21 | GA material | 94 | 0 | 2.8 | 0.6 | — | — | 7 | 376 | 561 |
| 22 | GA material | 92 | 5 | 1.7 | 0.1 | 1.4 | 0.7 | 6 | 471 | 636 |
| 23 | GA material | 93 | 6 | 1.8 | 0.3 | 1.1 | 0.8 | 10 | 453 | 612 |
| 24 | GA material | 96 | 3 | 3.4 | 0.9 | 3.3 | 1.5 | 2 | 390 | 574 |
| 25 | GA material | 92 | 5 | 1.8 | 0.2 | 1.3 | 0.4 | 16 | 455 | 615 |
| 26 | GA material | 88 | 10 | 1.0 | 0.5 | 1.2 | 0.4 | 5 | 467 | 615 |
| 27 | GA material | 93 | 6 | 1.8 | 0.3 | 1.2 | 0.3 | 9 | 396 | 582 |
| 28 | GA material | 88 | 12 | 1.7 | 0.1 | 1.0 | 0.2 | 12 | 397 | 576 |
| 29 | GA material | 90 | 10 | 1.2 | 0.2 | 0.8 | 0.7 | 6 | 420 | 575 |

TABLE 3-continued

| Steel sheet No. | Yield ratio *1 | Total elongation (%) | Edge quality of punched hole | λ (%) | Evaluation Stretch-flangeability | Coating quality | Remarks |
|---|---|---|---|---|---|---|---|
| 1 | 0.74 | 30 | ○ | 108 | ○ | ○ | Example |
| 2 | 0.72 | 27 | ○ | 116 | ○ | ○ | Example |
| 3 | 0.76 | 27 | x | 81 | x | ○ | Comparative example |
| 4 | 0.75 | 28 | x | 78 | x | ○ | Comparative example |
| 5 | 0.67 | 26 | x | 64 | x | ○ | Comparative example |
| 6 | 0.69 | 27 | x | 75 | x | ○ | Comparative example |
| 7 | 0.68 | 28 | x | 73 | x | ○ | Comparative example |
| 8 | 0.69 | 31 | x | 77 | x | ○ | Comparative example |
| 9 | 0.74 | 30 | x | 84 | x | ○ | Comparative example |
| 10 | 0.67 | 30 | x | 55 | x | ○ | Comparative example |
| 11 | 0.75 | 28 | x | 83 | x | ○ | Comparative example |
| 12 | 0.64 | 24 | x | 36 | x | ○ | Comparative example |
| 13 | 0.74 | 27 | ○ | 112 | ○ | ○ | Example |
| 14 | 0.74 | 28 | ○ | 105 | ○ | ○ | Example |
| 15 | 0.75 | 30 | ○ | 114 | ○ | ○ | Example |
| 16 | 0.72 | 30 | ○ | 96 | ○ | ○ | Example |
| 17 | 0.74 | 29 | ○ | 95 | ○ | ○ | Example |
| 18 | 0.61 | 36 | ○ | 128 | ○ | ○ | Comparative example |
| 19 | 0.72 | 36 | x | 31 | x | ○ | Comparative example |
| 20 | 0.76 | 30 | ○ | 92 | ○ | x | Comparative example |
| 21 | 0.67 | 30 | x | 74 | x | ○ | Comparative example |
| 22 | 0.74 | 28 | ○ | 93 | ○ | x | Comparative example |
| 23 | 0.74 | 28 | x | 69 | x | ○ | Comparative example |
| 24 | 0.68 | 28 | x | 81 | x | ○ | Comparative example |
| 25 | 0.74 | 27 | x | 61 | x | ○ | Comparative example |
| 26 | 0.76 | 30 | ○ | 108 | ○ | x | Comparative example |
| 27 | 0.68 | 29 | x | 66 | x | ○ | Comparative example |
| 28 | 0.69 | 28 | x | 61 | x | ○ | Comparative example |
| 29 | 0.73 | 29 | ○ | 101 | ○ | ○ | Comparative example |

*1 Yield ratio = yield strength/tensile strength

In any of the examples, a tensile strength TS of 590 MPa or more, good stretch-flangeability, and good coating quality were obtained. In the comparative examples, which are outside the range of the present invention, the tensile strength was less than 590 MPa, or the stretch-flangeability or coating quality was evaluated as unacceptable.

The invention claimed is:

1. A steel sheet comprising:
a component composition containing, on a percent by mass basis:
C: 0.06% or more and 0.10% or less,
Si: 0.07% or less,
Mn: 1.6% or more and 2.2% or less,
P: 0.03% or less,
S: 0.005% or less,
Al: 0.08% or less,
N: 0.0100% or less,
Ti: 0.015% or more and 0.035% or less, and
Nb: 0.030% or more and 0.055% or less, expressions (1), (2), and (3) being satisfied, and the balance being Fe and incidental impurities; and
a steel microstructure having an area fraction of a ferrite phase of 80% or more and 98% or less and an area fraction of a martensite phase of 2% or more and 15% or less, wherein ferrite grains have an average thickness of 3.0 μm or less in a sheet-thickness direction, the martensite phase has an average grain size of 2.0 μm or less, and a Nb-containing carbide precipitated in the ferrite grains has an average grain size of 8 nm or less, the area fraction, the average thickness, and the average grain size being determined by microstructure observation, and wherein the steel sheet has a tensile strength of 590 MPa or more, $$5.4[\% \text{ Si}]+[\% \text{ Mn}] \leq 2.2 \quad (1)$$

$$\{[\% \text{ Ti}]-3.4[\% \text{ N}]\}/[\% \text{ Nb}] \leq 0.40 \quad (2)$$

$$[\% \text{ Ti}]-3.4[\% \text{ N}] \geq 0 \quad (3)$$

where [% M] in expressions (1), (2), and (3) represents a content of an element M % by mass.

2. The steel sheet according to claim 1, wherein the component composition further contains, on a percent by mass basis, one or more elements selected from the following groups A wand/or B:
Group A:
one or more of: Cr: 0.001% or more and 0.1% or less, Ni: 0.001% or more and 1.0% or less, and V: 0.001% or more and 0.1% or less
Group B:
1.0% or less in total of one or more of REM, Cu, Sn, Sb, Mg, Ca, and Co.

3. A coated steel sheet comprising a coated layer on a surface of the steel sheet according to claim 1.

4. A coated steel sheet comprising a coated layer on a surface of the steel sheet according to claim 2.

5. The coated steel sheet according to claim 3, wherein the coated layer is a hot-dip galvanized layer or a hot-dip galvannealed layer, and the coated layer contains Fe: 20.0% or less by mass, Al: 0.001% or more by mass and 1.0% or less by mass, and 0% or more by mass and 3.5% or less by mass in total of one or two or more selected from Pb, Sb, Si, Sn, Mg, Mn, Ni, Cr, Co, Ca, Cu, Li, Ti, Be, Bi, and REM, the balance being Zn and incidental impurities.

6. The coated steel sheet according to claim 4, wherein the coated layer is a hot-dip galvanized layer or a hot-dip galvannealed layer, and the coated layer contains Fe: 20.0% or less by mass, Al: 0.001% or more by mass and 1.0% or less by mass, and 0% or more by mass and 3.5% or less by mass in total of one or two or more selected from Pb, Sb, Si, Sn, Mg, Mn, Ni, Cr, Co, Ca, Cu, Li, Ti, Be, Bi, and REM, the balance being Zn and incidental impurities.

7. A method for producing a hot-rolled steel sheet, comprising heating a steel having the component composition according to claim 1 to 1180° C. or higher and 1,300° C. or lower and subjecting the steel to hot rolling including rough rolling and finish rolling, cooling, and coiling, wherein a total reduction ratio in a final pass and a pass immediately preceding the final pass in the finish rolling is 20% or more, a finishing entry temperature is 1,100° C. or lower, a finishing delivery temperature is 820° C. or higher, a time from a completion of the finish rolling to a start of the cooling is within 3 seconds, an average cooling rate of the cooling is 30° C./s or more, a cooling stop temperature is 610° C. or lower, and a coiling temperature is 600° C. or lower.

8. A method for producing a hot-rolled steel sheet, comprising heating a steel having the component composition according to claim 2 to 1,180° C. or higher and 1,300° C. or lower and subjecting the steel to hot rolling including rough rolling and finish rolling, cooling, and coiling, wherein a total reduction ratio in a final pass and a pass immediately preceding the final pass in the finish rolling is 20% or more, a finishing entry temperature is 1,100° C. or lower, a finishing delivery temperature is 820° C. or higher, a time from a completion of the finish rolling to a start of the cooling is within 3 seconds, an average cooling rate of the cooling is 30° C./s or more, a cooling stop temperature is 610° C. or lower, and a coiling temperature is 600° C. or lower.

9. A method for producing a full hard cold-rolled steel sheet, comprising subjecting a hot-rolled steel sheet produced by the production method according to claim 7 to cold rolling at a cold-rolling reduction ratio of 40% or more.

10. A method for producing a full hard cold-rolled steel sheet, comprising subjecting a hot-rolled steel sheet produced by the production method according to claim 8 to cold rolling at a cold-rolling reduction ratio of 40% or more.

11. A method for producing a steel sheet, comprising subjecting a full hard cold-rolled steel sheet produced by the production method according to claim 9 to annealing under conditions at a dew point of −40° C. or lower in a temperature range of 600° C. or higher, an annealing temperature of 760° C. or higher and 840° C. or lower, an average cooling rate of 15° C./s or more from a cooling start temperature to 650° C., and a cooling stop temperature of 450° C. or higher and 550° C. or lower.

12. A method for producing a steel sheet, comprising subjecting a full hard cold-rolled steel sheet produced by the production method according to claim 10 to annealing under conditions at a dew point of −40° C. or lower in a temperature range of 600° C. or higher, an annealing temperature of 760° C. or higher and 840° C. or lower, an average cooling rate of 15° C./s or more from a cooling start temperature to 650° C., and a cooling stop temperature of 450° C. or higher and 550° C. or lower.

13. A method for producing a coated steel sheet, comprising coating a steel sheet produced by the production method according to claim 11.

14. A method for producing a coated steel sheet, comprising coating a steel sheet produced by the production method according to claim 12.

* * * * *

UNITED STATES PATENT AND TRADEMARK OFFICE
CERTIFICATE OF CORRECTION

PATENT NO. : 11,254,995 B2  
APPLICATION NO. : 16/089138  
DATED : February 22, 2022  
INVENTOR(S) : Noriaki Kohsaka Page 1 of 1

It is certified that error appears in the above-identified patent and that said Letters Patent is hereby corrected as shown below:

In the Claims

Column 22, Claim 2, Line 48 "groups A wand/or B:" should read -- groups A and/or B: --

Signed and Sealed this
Fifth Day of July, 2022

Katherine Kelly Vidal
*Director of the United States Patent and Trademark Office*